US012784305B2

(12) United States Patent
Fink et al.

(10) Patent No.: US 12,784,305 B2
(45) Date of Patent: Nov. 3, 2026

(54) SYSTEM AND METHOD FOR GENERATING AN IMAGE USING A GENERATIVE ARTIFICIAL INTELLIGENCE

(71) Applicant: MOTOROLA SOLUTIONS, INC., Chicago, IL (US)

(72) Inventors: Amihay Fink, Tel Aviv (IL); Maria Kokin, Tel Aviv (IL); Esti Kadison, Tel Aviv (IL); Eitan Chaimovich, Tel Aviv (IL); Haim Caspo, Tel Aviv (IL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 121 days.

(21) Appl. No.: 18/765,524

(22) Filed: Jul. 8, 2024

(65) Prior Publication Data

US 2026/0011040 A1 Jan. 8, 2026

(51) Int. Cl.
*G06T 11/60* (2026.01)
*G06T 11/00* (2026.01)

(52) U.S. Cl.
CPC .............. *G06T 11/60* (2013.01); *G06T 11/00* (2013.01); *G06T 2200/24* (2013.01)

(58) Field of Classification Search
None
See application file for complete search history.

(56) References Cited

U.S. PATENT DOCUMENTS

2023/0152906 A1* 5/2023 Jorasch .................... G06F 3/038 345/156
2023/0237708 A1* 7/2023 Muscolino .......... H04L 41/5009 345/629
2025/0157632 A1* 5/2025 Chunduru .............. G16H 50/50

OTHER PUBLICATIONS

Brooks et al.; "InstructPix2Pix: Learning to Follow Image Editing Instructions;" 2023; Proceedings of the IEEE/CVF Conference on Computer Vision and Pattern Recognition (CVPR)pp. 18392-18402 (Year: 2023).*
Zhang et al.; "TIE: Revolutionizing Text-based Image Editing for Complex-Prompt Following and High-Fidelity Editing;" May 27, 2024; arXiv:2405.16803; pp. 1-15 (Year: 2024).*
Bondareva, Mariya et al.: "System and Method for Selecting a Generated Image That is Representative of an Incident", U.S. Appl. No. 18/452,504, filed Sep. 7, 2023, all pages.
Bing Qin Lim, et al.: "Responsible AI that Distinguish 'Generative' & 'Factual' Generative AI content in Audio Form", Motorola Solutions, Inc. Sep. 28, 2023, pp. 1-3.

(Continued)

*Primary Examiner* — Peter Hoang

(57) ABSTRACT

Techniques for generating an image using a generative Artificial Intelligence (AI) are provided. A prompt to generate the image is received. The prompt includes factual information. A first portion of the image is generated. The first portion of the image is based on the factual information included in the prompt. The first portion of the image having a first stylization. A second portion of the image is generated. The second portion of the image based on information auto generated by the generative AI. The second portion of the image having a second stylization. The image with the first and second stylizations is displayed. The first and second stylizations indicate portions of the image that were based on factual information and portions of the image that were based on the generative AI auto generated information.

20 Claims, 5 Drawing Sheets

(56) References Cited

OTHER PUBLICATIONS

Li Wenbo et al: "Object-Driven Text-To-Image Synthesis via Adversarial Training", 2019 IEEE/CVF Conference on Computer Vision and Pattern Recognition (CVPR), IEEE, Jun. 15, 2019 (Jun. 15, 2019), pp. 12166-12174, XP033686380, DOI: 10.1109/CVPR.2019.01245.

Hong Seunghoon et al: "Interpretable Text-to-Image Synthesis with Hierarchical Semantic Layout Generation", Sep. 10, 2019 (Sep. 10, 2019), Advances in Databases and Information Systems; [Lecture Notes in Computer Science; Lect.Notes Computer], Springer International Publishing, Cham, pp. 77-95, XP047520568, ISBN: 978-3-319-10403-4.

Cheng Jijun et al: "Deep Adversarial Image Synthesis for Nuclei Segmentation of Histopathology Image", 2021 2nd Asia Conference on Computers and Communications (ACCC), IEEE, Sep. 24, 2021 (Sep. 24, 2021), pp. 63-68, XP034046396, DOI: 10.1109/ACCC54619.2021.00017.

Qiangpeng Yang et al: "SwapText: Image Based Texts Transfer in Scenes", arxiv.org, Cornell University Library, 201 Olin Library Cornell University Ithaca, NY 14853, Mar. 18, 2020 (Mar. 18, 2020), XP081624002.

Yichen Sun et al: "Prompt-Consistency Image Generation (PCIG): A Unified Framework Integrating LLMs, Knowledge Graphs, and Controllable Diffusion Models", arxiv.org, Cornell University Library, 201 Olin Library Cornell University Ithaca, NY 14853, Jun. 24, 2024 (Jun. 24, 2024), XP091798642.

The International Search Report and the Written Opinion, corresponding patent application No. PCT/US2025/035111, filed:Jun. 25, 2025, mailed: Oct. 13, 2025, all pages.

* cited by examiner

AUTO GENERATED INFORMATION

USER MODIFIED INFORMATION

SYSTEM AND METHOD FOR GENERATING AN IMAGE USING A GENERATIVE ARTIFICIAL INTELLIGENCE

BACKGROUND

The field of generative Artificial Intelligence (AI) is rapidly advancing. A user may create a text prompt to a generative AI, such as DALL-E™, and ask that an image be generated. The generative AI may then generate an image corresponding to the prompt. In addition, a user may specify the style of the generated image. For example, the user may want to see an image of a field created in a style similar to a famous photographer. The generative AI would then use this guidance to generate an image with the characteristics of the specified photographer. Images generated by AI are often so realistic it is difficult, if not impossible, to determine if the image is real or generated.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
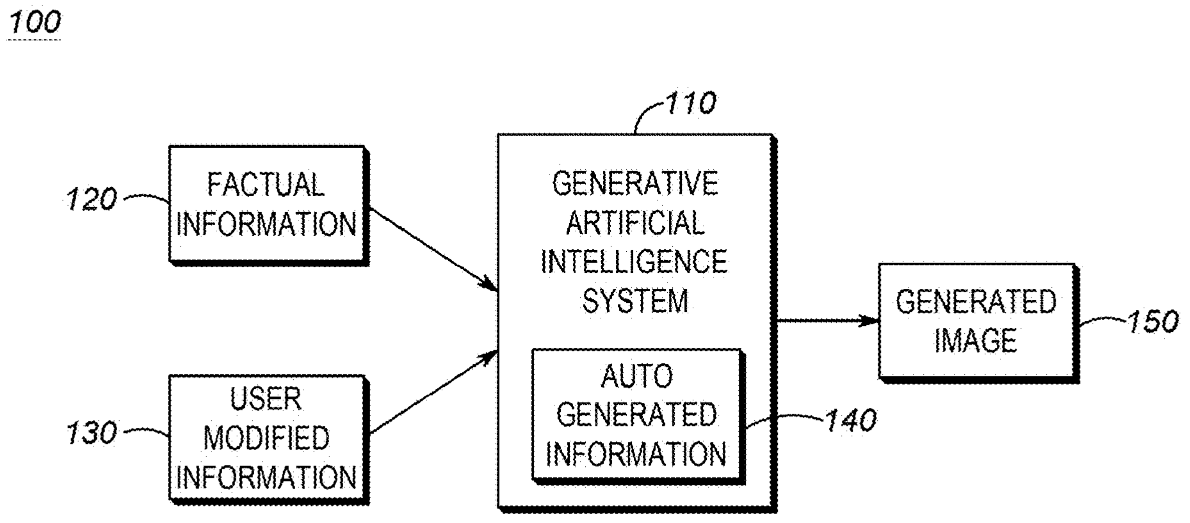
FIG. 1 is an example of a system that may implement the image generation techniques described herein.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

There are many uses for image creation by generative AIs. One example use case is the public safety field. For example, law enforcement may need to apprehend a suspect, but does not have a picture of the suspect. Instead, they may have verbal descriptions of the suspect from various sources. For example, people who witnessed the suspect committing a crime may be interviewed by law enforcement personnel and provide a description of the suspect (e.g. male, Caucasian, average height, overweight, etc.). Similarly, callers to an emergency number, such as 911, may also provide such descriptive information. Witnesses may also provide descriptive information via email, text message, or any other communications channel.

Generative AI may then be used to take the textual description information and generate an image based on this information. As humans may be better at interpreting visual images, as opposed to textual descriptions, the generated visual image may then be used for further investigation. For example, the image may be used to ask the public if anyone has seen the person depicted in the generated image.

A problem arises in that the generative AI system produces an image that is complete, but it cannot be determined which portions of the image are based on facts and which portions of the image are generated by the generative AI itself. This is a problem because portions of the generated image that were generated by the generative AI itself should not be relied upon in any type of investigation, as they do not necessarily have any connection to the real world.

For example, the generative AI may take in a textual description provided by the user. As will be explained in further detail below, the information provided by the user may be considered factual information, as it was received from someone who actually viewed the real scene. The textual description received from the user will likely not contain every necessary detail to generate the image. The generative AI will need to "fill in" some of the details. For example, a description of a person received from a user who viewed the person (e.g. factual information) may include that the person has blond hair. However, the description may not include the hairstyle (e.g. parted on the left, long hair, short hair, etc.). As such, the generative AI would need to select how the hair appears in the generated image. This portion of the image that is generated by the generative AI will be referred to as portions of the image that are auto generated by the generative AI.

A person using the generated image should not rely too heavily on portions of the image that were auto generated, as those portions may not necessarily have any basis in reality. Continuing with the above example, the generative AI may generate an image of a male, Caucasian, with blond hair. Because the generative AI was given no information about the hairstyle, it may have auto generated the image of the person with long hair. Because this portion was auto generated, it should not be given too much weight from someone utilizing the generated image. In other words, when looking for a similar person, the hairstyle should be considered a less important factor, as it was not provided by anyone who actually saw the person in reality.

The techniques described herein solve this problem, individually and collectively. When a generative AI is used to generate an image, different portions of the image are displayed such that portions that are generated based on factual information can be distinguished from portions that are auto generated by the generative AI. For example, portions of the image generated based on factual information may be displayed with photo realistic stylization, while portions that are auto generated may be displayed with cartoonlike stylization. Thus, a person viewing the generated image is made aware of which portions of the image are based on received facts and which portions of the image were auto generated by the generative AI, and thus is able to weigh confidence in each of those portions correctly.

Although the previous example has been in terms of a public safety use case including generation of an image of a person, it should be understood that this was for ease of description only. What should be understood is that any image generated by a generative AI may be created in such a way that factual, auto generated, and user modified portions of the generated image can be identified visually, thus ensuring that a viewer of the image is aware of how the image was created and which portions of the image can be relied upon with greater confidence. The content of the image is irrelevant.

A method of generating an image using a generative Artificial Intelligence (AI) is provided. The method includes receiving a prompt to generate the image, the prompt including factual information. The method further includes generating a first portion of the image, the first portion of the image based on the factual information included in the prompt, the first portion of the image having a first stylization. The method further includes generating a second portion of the image, the second portion of the image based on information auto generated by the generative AI, the second portion of the image having a second stylization. The method further includes displaying the image with the first and second stylizations, wherein the first and second stylizations indicate portions of the image that were based on factual information and portions of the image that were based on the generative AI auto generated information.

In one aspect, the method includes receiving the prompt, modified by a user, that also includes a user modified information, generating a third portion of the image, the third portion of the image based on the user modified information, the third portion of the image having a third stylization, and displaying the image with the third stylization. In one aspect, the method includes displaying the first portion of the image as a first layer and displaying the second portion of the image as a second layer, wherein each layer can be independently displayed.

A system for generating an image using a generative Artificial Intelligence (AI) is provided. The system includes a processor and a memory coupled to the processor. The memory contains a set of instructions thereon that when executed by the processor cause the processor to receive a prompt to generate the image, the prompt including factual information. The instructions further cause the processor to generate a first portion of the image, the first portion of the image based on the factual information included in the prompt, the first portion of the image having a first stylization. The instructions further cause the processor to generate a second portion of the image, the second portion of the image based on information auto generated by the generative AI, the second portion of the image having a second stylization. The instructions further cause the processor to display the image with the first and second stylizations, wherein the first and second stylizations indicate portions of the image that were based on factual information and portions of the image that were based on the generative AI auto generated information.

In one aspect, the system includes instructions that cause the processor to receive the prompt, modified by a user, that also includes a user modified information, generate a third portion of the image, the third portion of the image based on the user modified information, the third portion of the image having a third stylization, and display the image with the third stylization. In one aspect, the system includes instructions that cause the processor to display the first portion of the image as a first layer and display the second portion of the image as a second layer, wherein each layer can be independently displayed.

A non-transitory processor readable medium for generating an image using a generative Artificial Intelligence (AI) is provided. The medium contains thereon a set of instructions thereon that when executed by a processor cause the processor to receive a prompt to generate the image, the prompt including factual information. The medium also includes instructions that cause the processor to generate a first portion of the image, the first portion of the image based on the factual information included in the prompt, the first portion of the image having a first stylization. The medium also includes instructions that cause the processor to generate a second portion of the image, the second portion of the image based on information auto generated by the generative AI, the second portion of the image having a second stylization. The medium also includes instructions that cause the processor to display the image with the first and second stylizations, wherein the first and second stylizations indicate portions of the image that were based on factual information and portions of the image that were based on the generative AI auto generated information.

In one aspect, the medium includes instructions that cause the processor to receive the prompt, modified by a user, that also includes a user modified information, generate a third portion of the image, the third portion of the image based on the user modified information, the third portion of the image having a third stylization, and display the image with the third stylization. In one aspect, the medium includes instructions that cause the processor to display the first portion of the image as a first layer and display the second portion of the image as a second layer, wherein each layer can be independently displayed.

In one aspect, the first stylization is a realistic graphics style and the second stylization is a non-realistic graphics style. In one aspect, at least a portion of the factual information is received from an emergency call. In one aspect, the factual information is validated prior to generating the image. In one aspect, the user modifies at least one of the second or third portions of the image to indicate it should belong to the first portion of the image.

Further advantages and features consistent with this disclosure will be set forth in the following detailed description, with reference to the figures.

FIG. 1 is an example of a system that may implement the image generation techniques described herein. System 100 includes a generative artificial intelligence (AI) system 110. An example of a device that may implement the generative AI system is shown with respect to FIG. 5. The generative AI system may receive factual information 120, user modified information 130, and may itself generate auto generated information 140. Each of these types of information will be described in further detail below. The various pieces of information 120, 130, and 140 may be used by the generative AI to generate a generated image 150. The generated image will be described further with respect to FIGS. 2 and 3.

Factual information 120 is information received from someone who actually viewed the scene that is being recreated by the generative AI system 110. For example, in the case of a law enforcement situation where the description of a suspect will be used to generate an image of the suspect, factual information may be information that is received from someone who saw the suspect with their own eyes. Such information may be considered factual, because it has a basis in someone who, in fact, had firsthand observation of the details being provided.

For example, there may be an incoming 911 call from a first caller that says, "It was an adult male, very strong, and built like a wrestler." A second incoming 911 call may state, "He is a Caucasian man, in his 40s, with blue eyes, and a beard." There may be a field interview of a witness, and the witness may say, "He was wearing a blue jean jacket, with something around his neck." There may be an incoming text message that says the suspect was wearing two gold bracelets on his wrist. In addition, there may be information provided by sensors (e.g. a camera) that may provide information such as the suspect has blond hair. As all of this information was provided by first hand witnesses or sensors that directly perceived the characteristic, which should be a highly reliable source, the information may be considered factual.

In some implementations, prior to information being considered factual, it is validated. Validation may take place in many different forms. In one example validation technique, a piece of information is not considered factual until it is validated by independent receipt from two or more different sources. For example, the suspect will be considered to be male if such a description is provided by at least two different sources (e.g. two 911 calls, a 911 call and a text message, etc.).

In other example validation techniques, the source of the information may be considered as well when validating the information. For example, information provided by a sensor, such as a camera, may automatically be considered validated, because a camera is an objective observer. Similarly, information provided by a trained law enforcement officer may be considered validated, because the law enforcement officer is a trusted person. On the other hand, information provided by an untrained civilian witness may require validation through confirmation with another source. What should be understood is that factual information 120 is information that can be trusted as accurately, to the extent possible, portraying the actual description provided by real world observers.

Auto generated information 140 on the other hand has no basis in information provided by direct witnesses. As mention above, the generative AI system 110 will likely not have 100% of the information necessary to generate an accurate image. As such, there may be areas of the image that the generative AI system must "fill in" on its own. For example, if the factual information includes that the suspect had a beard, but no explanation of the type of beard (e.g. goatee, full beard, etc.) the generative AI system would need to essentially take a guess at the type of beard and include that in the generated image.

As should be clear, the viewer of the generated image 150 should not rely on portions of the image that were based on auto generated information, because those portions might not accurately reflect the factual information provided. For example, if the factual information 120 only says the suspect has a beard, and the generative AI system 110 auto generates 140 a full beard in the generated image, viewers of the generated image should not assume the suspect has a full beard, but should rather be aware that the suspect has a beard of some type. Nothing should be inferred about the type of beard from the generated image.

User modified information 130 is yet another type of information that may be used by the generative AI system 110 in order to generate an image 150. In some cases, an operator of a system may decide to modify information that is being input into the generative AI system. For example, the factual image may say the suspect was wearing a motorcycle vest type jacket, but remains silent on if the jacket has sleeves. The system operator may have knowledge that all motorcycle vests do not have sleeves, and may provide such information accordingly. This information cannot be considered factual, as it was not provided by a direct witness, but it is also not auto generated by the generative AI system.

In some cases, auto generated or user modified information may be promoted to factual information. For example, if a piece of auto generated information has been proven to be true (e.g. additional reporting confirms the auto generated information is correct), then the auto generated information could be considered factual and reflected as such in the generated image 150.

Figure 2A:
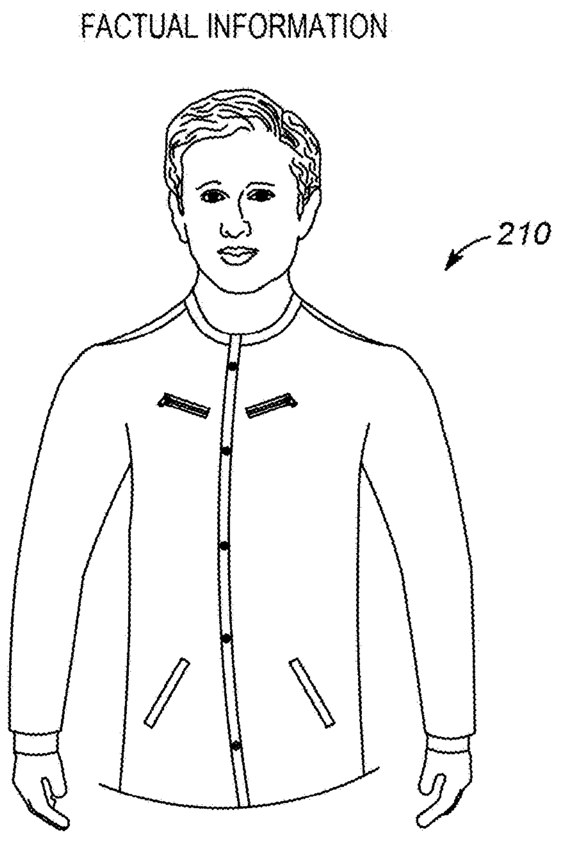
FIGS. 2A-C are an example of the different layers of a generated image according to the techniques described herein.
Figure 2B:
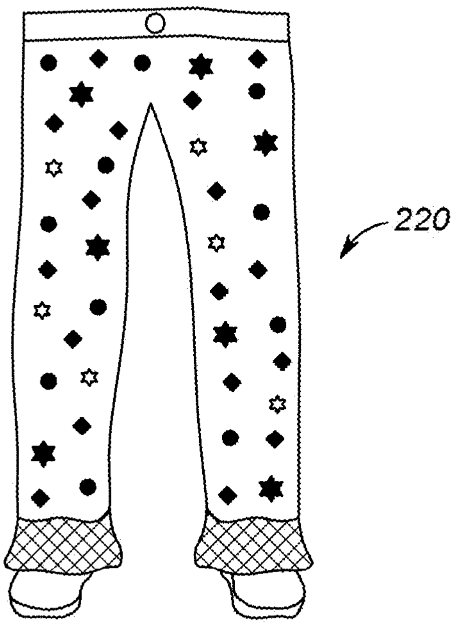
Figure 2C:
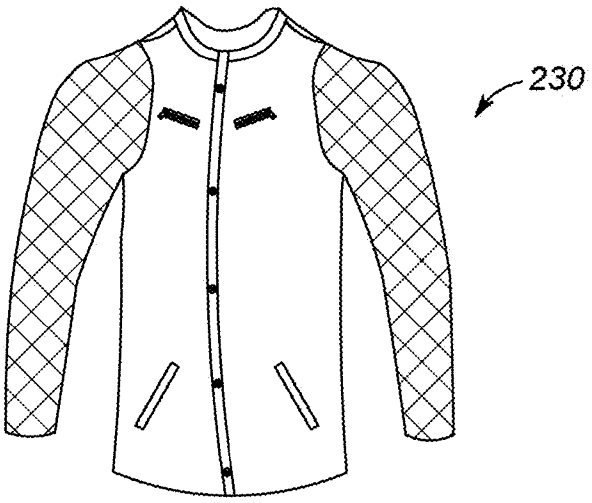

FIGS. 2A-C are an example of the different layers of a generated image according to the techniques described herein. For purposes of the description of FIG. 2, assume that there has been a report that the suspect is male, Caucasian, and is wearing a motorcycle jacket. For ease of description, assume that this information provided has been validated and is considered to be factual information. Furthermore, assume that the system operator is aware that motorcycle jackets do not have sleeves, and has provided this user modified information. The remainder of the image may then consist of auto generated content (e.g. content not based on factual or user modified information).

FIG. 2A depicts an image generated by a generated AI system based on the portion of the information that is taken as factual. In this example, the factual information is that the subject is male, Caucasian, and is wearing a motorcycle jacket. As shown in the generated image 210, there is a male Caucasian subject who is wearing a motorcycle jacket. Note, at this point, the description says that the subject is wearing a motorcycle jacket, and absent any additional information, jackets generally have long sleeves. As such, the portion of the image 210 based on factual information will include a jacket with long sleeves.

The portion of the image generated 210 based on the factual information may be stylized in a particular way to identify the portion. For example, the stylization may include a photorealistic stylization. In other words, the portion of the image generated based on factual information may appear to look like a real photograph. The generated image 210 may be said to be included in a layer, which might be referred to as a factual layer.

FIG. 2B depicts an image generated by a generative AI system based on the portion of the image that is taken as auto generated. In the present example, there is no factual information provided that describes the pants the suspect is wearing. As such, this information is entirely auto generated by the generative AI system. Generated image 220 depicts a pair of pants that has been auto generated by the generative AI system. As should be clear, the auto generated image is based on the generative AI system alone, and as such might be given less weight than portions of the image generated based on factual information.

The portion of the image generated 220 based on the auto generated information may be stylized in a particular way to identify the portion, and in particular to distinguish the auto generated portion from the factual portion. For example, the stylization may include a cartoon like stylization. In other words, portions of the image that are auto generated may appear cartoonlike. The generated image 220 may be said to be included in a layer, which might be referred to as an auto generated layer.

FIG. 2C depicts an image generated by a generative AI system based on the portion of the image that is taken as user modified information. In the present example, the system operator has provided information that motorcycle jackets do not have sleeves. As this information was not directly provided by someone viewing the suspect, the information cannot be considered factual. The information is also not auto generated, as the generative AI system generated a jacket with full length sleeves. Generated image 230 depicts a jacket with no sleeves.

The portion of the image generated 230 may be stylized in a particular way to identify the portion, and in particular to distinguish the user modified portion from the factual and auto generated portions. For example, the stylization may include using a crosshatch pattern to indicate portions based on the user modified information. The generated image 230 may be said to be included in a layer, which might be referred to as a user modified layer.

Although three forms of stylization (photorealistic, cartoonlike, and crosshatch) have been described above, it should be understood that these were simply examples chosen for ease of description and depiction in black and white drawings. There can be any number of other types of stylizations. Some further examples may include vectored stylization, using different levels of blurriness, using different colors, or any other type of stylization currently available or developed in the future. What should be understood is that any stylization that allows the viewer of the generated image to distinguish between the factual layer, the auto generated layer, and the user modified layer would be suitable for use with the techniques described herein.

Furthermore, it should be understood that the choice of stylization for each layer may be left up to the user. For example, the user may choose to have the factual layer depicted as a cartoon and the auto generated layer appear in a certain color (e.g. red). Thus, the type of stylization for each layer is not fixed.

Figure 3:
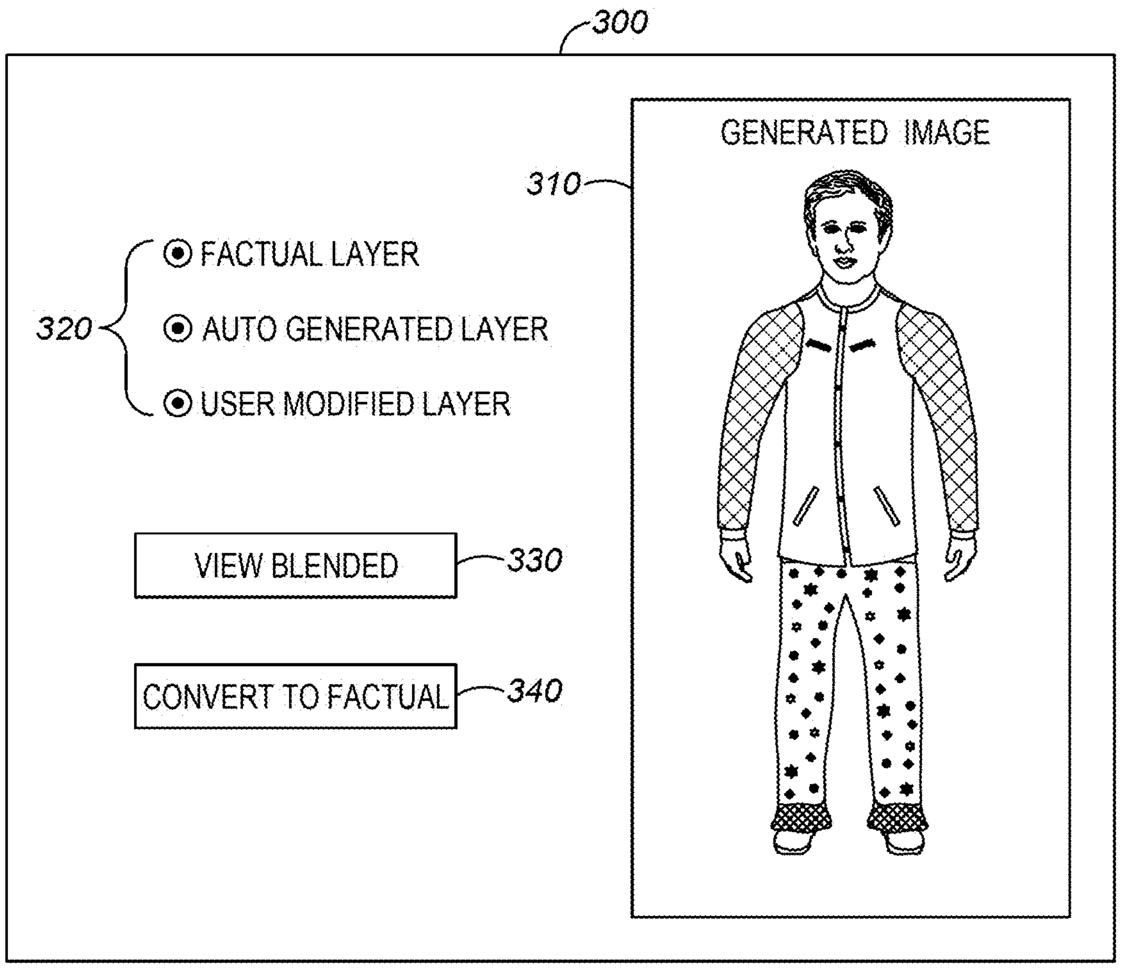
FIG. 3 is an example of the composite image created by combining the layers of the generated image.

FIG. 3 is an example of the composite image created by combining the layers of the generated image. The user display 300 may include a portion of the screen to display the generated image 310. As shown, the generated image may be created by superimposing each of the generated layers described with respect to FIG. 2 on top of each other, including the respective styling of each layer. As shown, the realistic portions are shown as photorealistic, the auto generated portions are shown as cartoon like, and the user modified portions are shown as crosshatched.

The user may also be provided with a set of controls to determine which layers are displayed. For example, controls 320 may be a set of radio buttons that allows the user to switch on each layer independently. For example, if the user wishes to only see portions of the image that were based on factual information, the user could turn off the auto generated and user modified layers.

Furthermore, the user may be given the option to view the generated image in a blended format. For example, the view blended 330 option may cause all stylization to be removed, thus removing the ability to distinguish between the different layers. Such a capability may be useful if the stylization is causing confusion when viewing the image.

The user may also be given the option to convert auto generated or user modified information to factual information. For example the control 340 may allow a user to designate information that was previously indicated as auto generated or user modified as factual when additional information is received. In the present example, the user modified information to indicate that the motorcycle jacket had no sleeves. If it is later determine that the motorcycle jacket did indeed not have sleeves, that information could be modified to indicate it was factual.

The particular user interface for modifying information to indicate it is factual is relatively unimportant. In some implementations, the area may be selected by a mouse. In some implementations, an entire layer can be indicated as factual. What should be understood is that portions of the image that were auto generated or generated based on user modified information can be modified such that those portions are now considered factual.

Although the examples described thus far were in terms of static images, the techniques described herein are not so limited. Generative AI may be used to generate dynamic content, such as movie clips, as well as static content. The techniques described herein are equally applicable to dynamic content, which is essentially a series of static images displayed in sequence. What should be understood is that the techniques described herein apply equally to both static and dynamic generated images.

Figure 4:
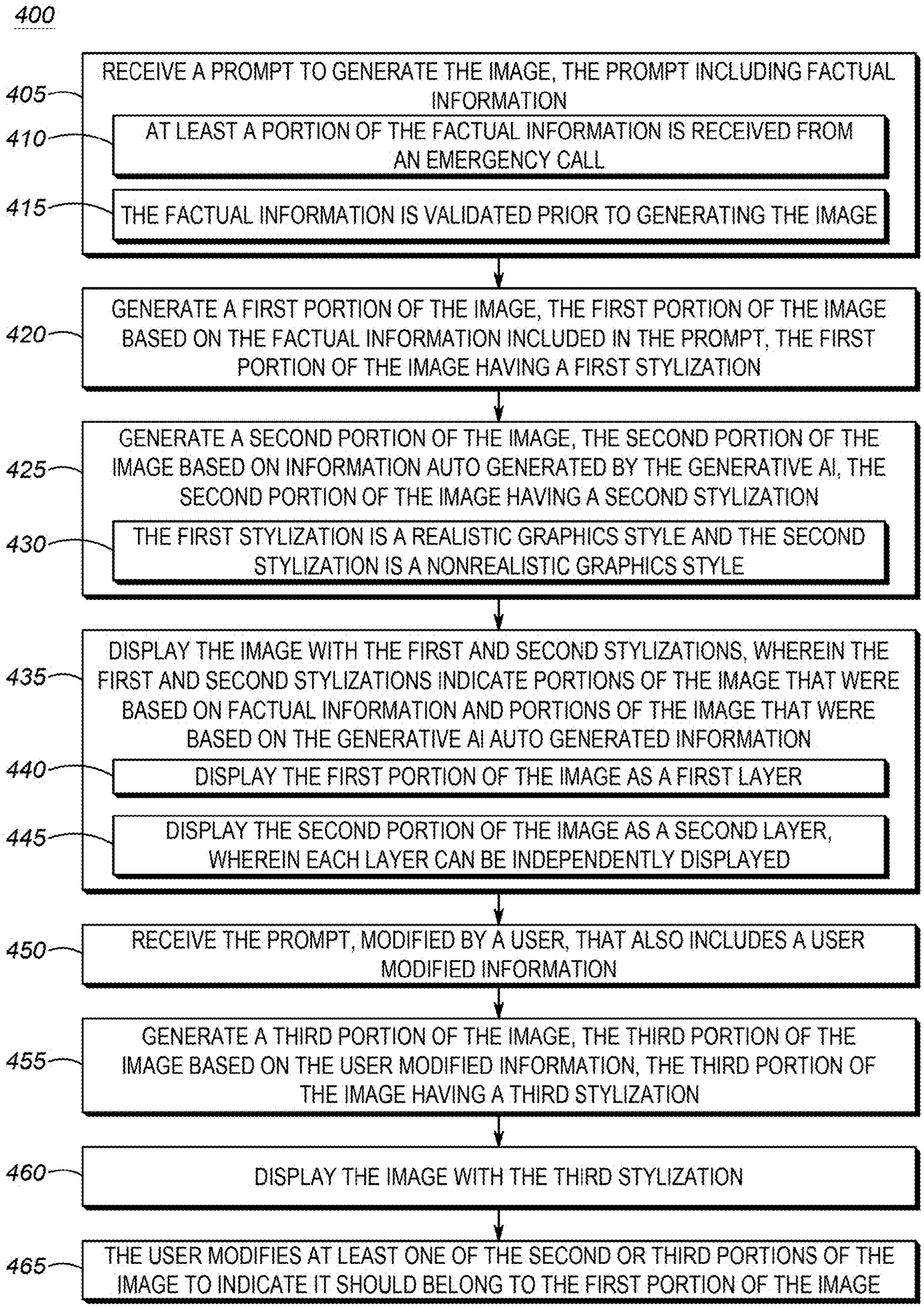
FIG. 4 is an example flow diagram that may implement the image generation techniques described herein.

FIG. 4 is an example flow diagram 400 that may implement the image generation techniques described herein. In block 405, a prompt to generate the image is received. The prompt includes factual information. As explained above, factual information is information that is provided by an entity that has firsthand knowledge of the information being provided. Typically this is information provided from a person who witnessed the event and/or person for which an image is being generated. In some cases, factual information may be provided from purely objective sources, such as sensors (e.g. cameras, etc.). What should be understood is that factual information can generally be treated as true, and portions of the generated image based on the factual information may also be treated as having high confidence that those portions are accurate.

In block 410, at least a portion of the factual information is received from an emergency call. As explained above, one use case for the techniques described herein is in a public safety context. An emergency number (e.g. 911, etc.) caller may make an emergency call to a public safety answering point to report some type of incident. During the reporting, descriptions may be provided (e.g. suspect description, car accident description, fire description, etc.). The information provided from an emergency call may be considered factual as it is being reported by someone who viewed the incident.

In block 415, the factual information is validated prior to generating the image. Although information provided by a person who viewed something (e.g. person, incident, etc.) is likely to be accurate, human perception can sometimes be subjective. In some cases, received information should first be validated before considering the received information factual. Validation can include things such as verifying the same information was received from two separate sources, the information was verified via comparison with sensor (e.g. camera, etc.) provided information, the information was verified via comparison with external sources, etc. In other words, in some implementations, information is not considered factual unless there is a high degree of confidence that the received information is accurate.

In block 420, a first portion of the image is generated. The first portion of the image is based on the factual information included in the prompt. The first portion of the image having a first stylization. The first portion of the image can be treated as having high confidence that the first portion of the image is correct. The reason being that it is based on factual information that has possibly also been validated. The first portion of the image is generated with stylization that can be used to distinguish and separate the first portion of the image from other portions of the generated image.

In block 425, a second portion of the image is generated. The second portion of the image is based on information auto generated by the generative AI. The second portion of the image having a second stylization. The auto generated information is information that is produced by the generative AI itself, in order to fill in details not provided by the factual information. As such, there should be less confidence placed in the second portion of the image, as the auto generated information has no real basis in fact, and is just the generative AI's best effort at filling in missing details. The second stylization is used in order to distinguish the auto generated portion of the image from the other portions of the image.

In block 430, the first stylization is a realistic graphics style and the second stylization is a non-realistic graphics style. For example, the first stylization may be a photo realistic stylization and the second stylization is a cartoon like stylization. The specific types of stylization are relatively unimportant. What should be understood is that the different types of stylization allow the different portions of the image to be distinguished from one another. In some implementations, the particular type of stylization applied to each portion of the image is specified by the user viewing the generated image.

In block 435, the image is displayed with the first and second stylizations. The first and second stylizations indicate portions of the image that were based on factual information and portions of the image that were based on the generative AI auto generated information. This allows the user to know which portions of the image can be treated with high confidence and which portions of the image should be treated with lower confidence.

In block 440, the first portion of the image is displayed as a first layer. For example, the first portion of the image may be based on factual information and is displayed in a factual layer. The stylization applied to the factual layer may be preprogrammed or may be selected by the user.

In block 445, the second portion of the image is displayed as a second layer. Each layer can be independently displayed. The second layer may be referred to as the auto generated layer because it is based on information supplied by the generative AI itself. By allowing each layer to be independently displayed, the user can select which portions of the generated image they wish to see. If they only wish to see portions that reflect a high level of confidence, they may select the factual layer only to be displayed. If they wish to see portions of the image that are not necessarily based in facts, the auto generated layer can be displayed.

In block 450, the prompt received is modified by a user and includes a user modified information. As described above, the user may add information to the prompt that is not considered factual information. For example, the user may have some knowledge about the image to be generated and provides that information. The user modified information may not be treated with the same level of confidence as the factual information, because it was not provided by someone who had a firsthand view of the scene. However, the user modified image may be given a confidence weight higher than the auto generated information, because it is based on human provided input, as opposed to being solely machine generated.

In block 455, a third portion of the image is generated. The third portion of the image is based on the user modified information. The third portion of the image having a third stylization. Just as explained above with the factual layer and the auto generated layer, the third layer based on the user modified information may have its own stylization that allows that portion of the image to be distinguished from the factual and auto generated layers.

In block 460, the image with the third stylization is displayed. Just as explained above, the user has the ability to select which layers are displayed. The user may select any combination of the factual, auto generated, and user modified layers to display at any given time. As explained above the user may also be able to select the particular stylization for each of the layers.

In block 465, the user modifies at least one of the second or third portions of the image to indicate it should belong to the first portion of the image. In other words, information that was auto generated or modified by the user may be promoted to factual information. For example, confirmation of an image element is received through other sources (e.g. a later witness confirms what they say in real life is equivalent to what is displayed in the auto generated or user modified layer) which means that the information can be considered factual. What should be understood is that portions of the image that were generated using non-factual information can be promoted to factual information, and thus be displayed using the stylization associated with the factual information.

Figure 5:
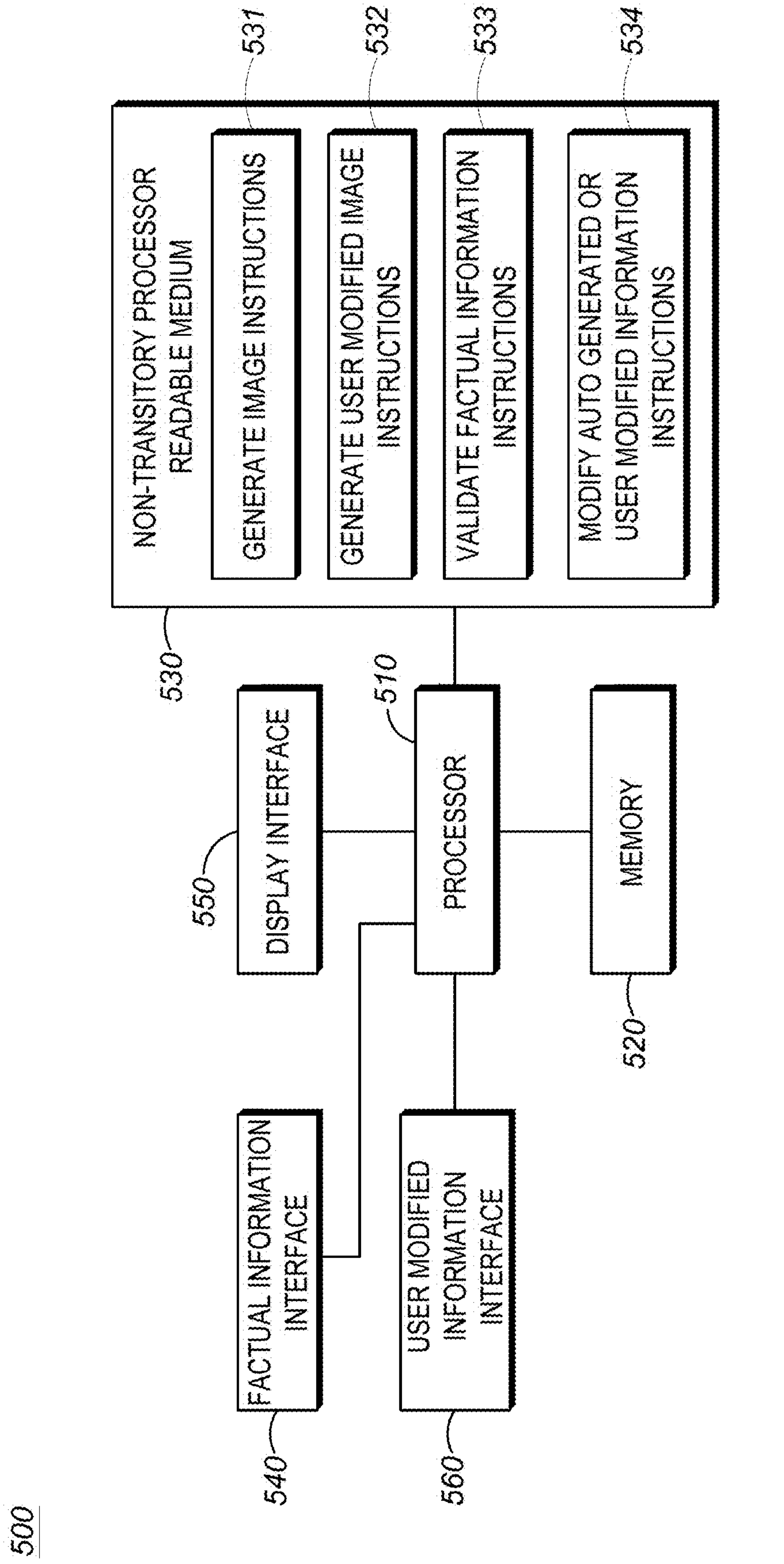
FIG. 5 is an example of a device that my implement the image generation techniques described herein.

FIG. 5 is an example of a device 500 that may implement the image generation techniques described herein. It should be understood that FIG. 5 represents one example implementation of a computing device that utilizes the techniques described herein. Although only a single processor is shown, it would be readily understood that a person of skill in the art would recognize that distributed implementations are also possible. For example, the various pieces of functionality described above (e.g. image generation, image modification, etc.) could be implemented on multiple devices that are communicatively coupled. FIG. 5 is not intended to imply that all the functionality described above must be implemented on a single device.

Device 500 may include processor 510, memory 520, non-transitory processor readable medium 530, factual information interface 540, display interface 550, and user modified image interface 560.

Processor 510 may be coupled to memory 520. Memory 520 may store a set of instructions that when executed by processor 510 cause processor 510 to implement the techniques described herein. Processor 510 may cause memory 520 to load a set of processor executable instructions from non-transitory processor readable medium 530. Non-transitory processor readable medium 530 may contain a set of instructions thereon that when executed by processor 510 cause the processor to implement the various techniques described herein.

For example, medium 530 may include generate image instructions 531. The generate image instructions 531 may cause the processor to receive factual information via the factual information interface 540. The factual information interface 540 may receive input from sources such as 911 calls, transcripts of witness interviews, text messages, etc. Using the received factual information and auto generated information, an image may be generated. The generated image may be displayed via the display interface 550. The display interface 550 may be any type of display device such as a computer monitor, smartphone screen, etc. The generate image instructions 531 are described throughout this description generally, including places such as the description of blocks 405, 410, and 420-445.

The medium 530 may include generate user modified image instructions 532. The generate user modified image instructions 532 may cause the processor to receive input from the user to modify the generated image in some way. The user modified information may be received via the user modified information interface 560. The user modified information interface 560 may include traditional inputs, such as a keyboard and mouse or may include a touchscreen interface. In some implementations, the user modified information interface 560 may be integrated with the display interface 550. The received user modified information may be used to generate the portions of the image. The generate user modified image instructions 532 are described throughout this description generally, including places such as the description of blocks 450-460.

The medium 530 may include validate factual information instructions 533. The validate factual information instructions 533 may cause the processor to ensure that factual information received via the factual information interface 540 is accurate. For example, by confirming the same information has been provided by more than one source. The validate factual information instructions 533 are described throughout this description generally, including places such as the description of block 415.

The medium 530 may include modify auto generated or user modified information instructions 534. The modify auto generated or user modified information instructions 534 may cause the processor to receive input from the user via the user modified information interface 560 to promote portions of the image that are auto generated or user modified to factual. The modify auto generated or user modified information instructions 534 are described throughout this description generally, including places such as the description of block 465.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot implement a generative AI that produces images that distinguish between factual and auto generated portions of the image, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/or hardware. For example, instead of being located within and performed by a single electronic processor, logic and processing described herein may be distributed among multiple electronic processors. Similarly, one or more memory modules and communication channels or networks may be used even if embodiments described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of generating an image using a generative Artificial Intelligence (AI) comprising:

receiving a prompt to generate the image, the prompt including factual information, the factual information based on a description of a real scene provided by a witness at the real scene;

generating a first portion of the image, the first portion of the image based on the factual information included in the prompt, the first portion of the image having a first stylization;

generating a second portion of the image, the second portion of the image based on information auto generated by the generative AI, the second portion of the image having a second stylization, wherein the auto generated portion of the image is not provided by the witness; and displaying the image with the first and second stylizations, wherein the first and second stylizations indicate portions of the image that were based on factual information and portions of the image that were based on the generative AI auto generated information, wherein the first stylization indicates portions of the image that can be relied on as an accurate portrayal of the real scene and the second stylization indicates portions of the image that should not be relied on.

2. The method of claim 1 further comprising:

receiving the prompt, modified by a user, that also includes a user modified information;

generating a third portion of the image, the third portion of the image based on the user modified information, the third portion of the image having a third stylization; and displaying the image with the third stylization.

3. The method of claim 1 wherein the first stylization is a realistic graphics style and the second stylization is a non-realistic graphics style.

4. The method of claim 1 further comprising:

displaying the first portion of the image as a first layer; and displaying the second portion of the image as a second layer, wherein each layer can be independently displayed.

5. The method of claim 1 wherein at least a portion of the factual information is received from an emergency call.

6. The method of claim 1 wherein the factual information is validated prior to generating the image.

7. The method of claim 2 wherein the user modifies at least one of the second or third portions of the image to indicate it should belong to the first portion of the image.

8. A system for generating an image using a generative Artificial Intelligence (AI) comprising:

a processor; and a memory coupled to the processor containing a set of instructions thereon that when executed by the processor cause the processor to:

receive a prompt to generate the image, the prompt including factual information, the factual information based on a description of a real scene provided by a witness at the real scene;

generate a first portion of the image, the first portion of the image based on the factual information included in the prompt, the first portion of the image having a first stylization;

generate a second portion of the image, the second portion of the image based on information auto generated by the generative AI, the second portion of the image having a second stylization, wherein the auto generated portion of the image is not provided by the witness; and display the image with the first and second stylizations, wherein the first and second stylizations indicate portions of the image that were based on factual information and portions of the image that were based on the generative AI auto generated information, wherein the first stylization indicates portions of the image that can be relied on as an accurate portrayal of the real scene and the second stylization indicates portions of the image that should not be relied on.

9. The system of claim 8 further comprising instructions to:

receive the prompt, modified by a user, that also includes a user modified information;

generate a third portion of the image, the third portion of the image based on the user modified information, the third portion of the image having a third stylization; and display the image with the third stylization.

10. The system of claim 8 wherein the first stylization is a realistic graphics style and the second stylization is a non-realistic graphics style.

11. The system of claim 8 further comprising instructions to:

display the first portion of the image as a first layer; and display the second portion of the image as a second layer, wherein each layer can be independently displayed.

12. The system of claim 8 wherein at least a portion of the factual information is received from an emergency call.

13. The system of claim 8 wherein the factual information is validated prior to generating the image.

14. The system of claim 9 wherein the user modifies at least one of the second or third portions of the image to indicate it should belong to the first portion of the image.

15. A non-transitory processor readable medium for generating an image using a generative Artificial Intelligence (AI) containing a set of instructions thereon that when executed by a processor cause the processor to:

receive a prompt to generate the image, the prompt including factual information, the factual information based on a description of a real scene provided by a witness at the real scene;

generate a first portion of the image, the first portion of the image based on the factual information included in the prompt, the first portion of the image having a first stylization;

generate a second portion of the image, the second portion of the image based on information auto generated by the generative AI, the second portion of the image having a second stylization, wherein the auto generated portion of the image is not provided by the witness; and display the image with the first and second stylizations, wherein the first and second stylizations indicate portions of the image that were based on factual information and portions of the image that were based on the generative AI auto generated information, wherein the first stylization indicates portions of the image that can be relied on as an accurate portrayal of the real scene and the second stylization indicates portions of the image that should not be relied on.

16. The non-transitory processor readable medium of claim 15 further comprising instructions to:

receive the prompt, modified by a user, that also includes a user modified information;

generate a third portion of the image, the third portion of the image based on the user modified information, the third portion of the image having a third stylization; and display the image with the third stylization.

17. The non-transitory processor readable medium of claim 15 further comprising instructions to:

display the first portion of the image as a first layer; and display the second portion of the image as a second layer, wherein each layer can be independently displayed.

18. The non-transitory processor readable medium of claim 15 wherein at least a portion of the factual information is received from an emergency call.

19. The non-transitory processor readable medium of claim 15 wherein the factual information is validated prior to generating the image.

20. The non-transitory processor readable medium of claim 16 wherein the user modifies at least one of the second or third portions of the image to indicate it should belong to the first portion of the image.

* * * * *